United States Patent
Antani et al.

(10) Patent No.: US 7,970,757 B2
(45) Date of Patent: Jun. 28, 2011

(54) COMPUTER PROGRAM PRODUCT FOR DATABASE QUERY OPTIMIZATION

(75) Inventors: Snehal S. Antani, Hyde Park, NY (US); Chon N. Lei, Poughkeepsie, NY (US); Adarsh R. Pannu, San Jose, CA (US); Rajesh P. Ramachandran, Santa Clara, CA (US)

(73) Assignee: International Business Machines Corporation, Armonk, NY (US)

( * ) Notice: Subject to any disclaimer, the term of this patent is extended or adjusted under 35 U.S.C. 154(b) by 375 days.

(21) Appl. No.: 12/049,644

(22) Filed: Mar. 17, 2008

(65) Prior Publication Data
US 2009/0234800 A1 Sep. 17, 2009

(51) Int. Cl.
*G06F 17/30* (2006.01)

(52) U.S. Cl. .................. 707/721; 707/713

(58) Field of Classification Search .................. None
See application file for complete search history.

(56) References Cited

U.S. PATENT DOCUMENTS

| | | | |
|---|---|---|---|
| 5,732,258 A * | 3/1998 | Jakobsson et al. | 1/1 |
| 6,466,931 B1 * | 10/2002 | Attaluri et al. | 1/1 |
| 6,629,094 B1 * | 9/2003 | Colby et al. | 707/713 |
| 6,898,588 B2 | 5/2005 | Kosciuszko et al. | |
| 7,092,931 B1 | 8/2006 | Kaluskar et al. | |
| 7,720,839 B2 * | 5/2010 | Barsness et al. | 707/713 |
| 7,752,197 B2 * | 7/2010 | Dettinger et al. | 707/721 |
| 7,877,378 B2 * | 1/2011 | Gray | 707/718 |
| 2003/0120643 A1 | 6/2003 | Bird et al. | |
| 2003/0200204 A1 * | 10/2003 | Limoges et al. | 707/3 |
| 2004/0002941 A1 | 1/2004 | Thorne et al. | |
| 2004/0162836 A1 | 8/2004 | Aronoff et al. | |
| 2004/0196845 A1 | 10/2004 | Kunze et al. | |
| 2006/0155683 A1 | 7/2006 | Bangel et al. | |
| 2006/0212428 A1 | 9/2006 | Nelson | |
| 2006/0224563 A1 | 10/2006 | Hanson et al. | |
| 2007/0168324 A1 | 7/2007 | Grabs et al. | |

OTHER PUBLICATIONS

Khaled, et al., "SQL Statement Template: A Development Approach for Database-Driven Applications", 2004 IEEE, pp. 12-17.
Oracle Corporation, "Build Internet Applications with Oracle Forms and Oracle Reports", Hands On Session Building Reports, pp. 1-28.

* cited by examiner

*Primary Examiner* — Apu M Mofiz
*Assistant Examiner* — Hung D Le
(74) *Attorney, Agent, or Firm* — Cantor Colburn LLP; Stephen Kaufman

(57) ABSTRACT

A computer program product for database query optimization including a computer usable medium having a computer readable program, wherein the computer readable program, when executed on a computer, causes the computer to receive a database query, search the database query for a literal term, replace the literal term in the database query with a placeholder term to put the database query in a template form, search a directory for a replacement query that corresponds to the database query in the template form, replace the database query with the replacement query and include the placeholder term in the replacement query, and replace the placeholder term in the replacement query with the corresponding literal term to put the replacement query in an executable format, wherein the replacement query is an optimized substitute for the database query.

5 Claims, 3 Drawing Sheets

COMPUTER PROGRAM PRODUCT FOR DATABASE QUERY OPTIMIZATION

BACKGROUND OF THE INVENTION

1. Field of the Invention

This invention relates generally to database management and particularly to a computer program product for database query optimization.

2. Description of Background

The use of programs such as "database management systems" (DBMSs) to search or "query" collections of data or "databases" (DBs) in numerous forms, such as text, graphics, audio, or video, is very popular in most industries throughout the world, including financial, goods and services, governmental, medical, and technological industries. For a long time, such users have developed their DB programs internally, for example, with the assistance of programmers who are employees, contractors, consultants, etc., and this in-house development has typically provided customized, well performing programs. However, the increasing costs of utilizing specialized programmers and the often significant changes in DB program function requirements, for example, due to business changes and technological advances, has resulted in a new trend of DB program users relying more on DB programs that are pre-developed by independent software vendors (ISVs).

The use of such ISV DB programs offers advantages such as improved costs and the flexibility to quickly address changing function requirements (e.g., by purchasing other packages). However, there is a tradeoff of the inability of users to modify ISV DB programs for optimal query performance, since the programs are usually provided in an uneditable format such as object code only (OCO). For example, since many ISV DB programs are pre-developed for multiple usage on various computer platforms, they include program code or "structured query language" (SQL) in generic formats or "statements" that can sometimes cause less than desirable performance, such as slow execution of DB queries, depending on specific user needs and/or DB characteristics. Although there are tools available to DB administrators to help identify problem causing SQL statements that are provided by ISV DB programs in an effort to accommodate their use, there is still the inability to replace the problem statements in the programs to efficiently resolve undesirable query performance. As a result, users typically rely on an often speculative, time consuming process of persuading the ISV to modify the DB programs accordingly. Thus, it is desirable to overcome this inability to efficiently optimize DB query performance through the replacement of problem causing SQL statements when using ISV DB programs.

SUMMARY OF THE INVENTION

A computer program product for database query optimization is provided. An exemplary embodiment of the computer program product includes a computer usable medium having a computer readable program, wherein the computer readable program, when executed on a computer, causes the computer to receive a database query, search the database query for a literal term, replace the literal term in the database query with a placeholder term to put the database query in a template form, search a directory for a replacement query that corresponds to the database query in the template form, replace the database query with the replacement query and include the placeholder term in the replacement query, and replace the placeholder term in the replacement query with the corresponding literal term to put the replacement query in an executable format, wherein the replacement query is an optimized substitute for the database query.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention are apparent from the following detailed description taken in conjunction with the accompanying drawings in which;

DETAILED DESCRIPTION OF THE INVENTION

According to exemplary embodiments of the invention described herein, a computer program product for database query optimization is provided. In accordance with such exemplary embodiments, database query performance can be efficiently optimized through the replacement of problem causing query statements generated when using database programs, such as uneditable (e.g., object code only) database programs developed by independent software vendors.

Figure 1:
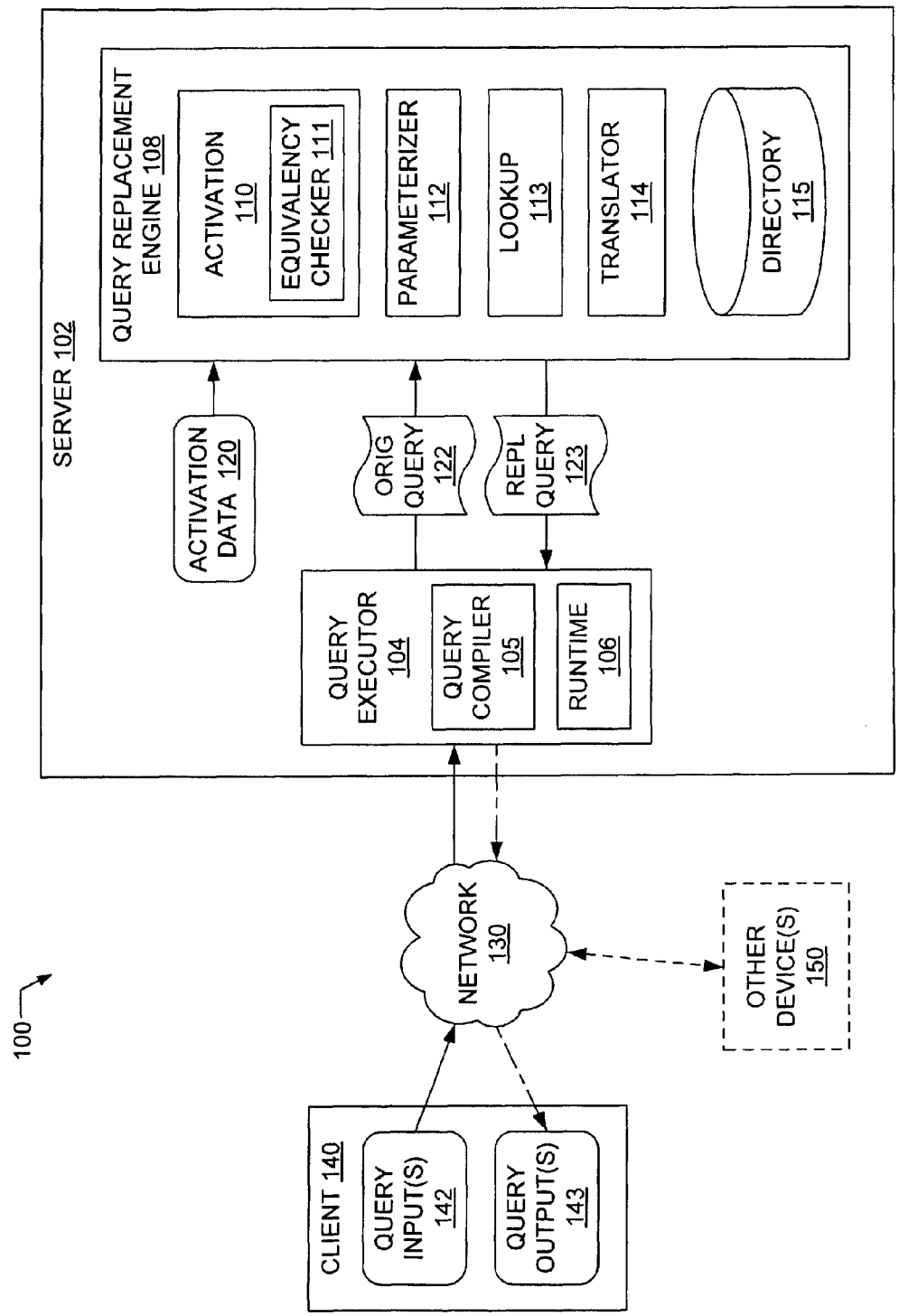
FIG. 1 is a block diagram illustrating an example of a computer system including an exemplary computing device configured for database query optimization.

Turning now to the drawings in greater detail, wherein like reference numerals indicate like elements, FIG. 1 illustrates an example of a computer system 100 including exemplary computing device ("server") 102 configured for database query optimization. In addition to server 102, exemplary computer system 100 includes network 130 and a second exemplary computing device ("client") 140, and may also include other device(s) 150. Network 130 connects server 102, client 140, and other device(s) 150 and may include one or more wide area networks (WANs) and/or local area networks (LANs) such as the Internet, intranet(s), and/or wireless communication network(s). Other device(s) 150 may include one or more other computing devices, e.g., one or more other servers, clients, etc. Server 102, client 140, and other device(s) 150 are in communication via network 130, e.g., to communicate database queries (e.g., query input(s) 142 and query output(s) 143) between them.

Exemplary server 102 includes (not depicted) a processor, input/output component(s), and memory, which are in communication via a bus. The input/output component(s) may include one or more components that facilitate local and/or remote input/output operations to/from server 102, such as a display, keyboard, modem, network adapter, etc. (not depicted). The memory includes various components stored therein (e.g., of a computer program product) for database query management, which are executable, e.g., by server 102 via the processor. These components include query executor 104, query compiler 105, runtime 106, and query replacement engine 108. Query replacement engine 108 includes components (e.g., modules) for database query optimization, including activation 110, equivalency checker 111, parameterizer 112, lookup 113, translator 114, and directory 115. An exemplary operation of these components 104, 105, 106, 108, 110, 111, 112, 113, 114, 115 will be described below.

As will also be described below, activation data 120 can be input to query replacement engine 108 via server 102 (e.g., by a database administrator or other user). Furthermore, an original query 122 can be input to query replacement engine 108 from query executor 104, and a replacement query 123 can be output, from, query replacement engine 108 to query executor 104. Additionally, query input(s) 142 can be input to query executor 104 from client 140 via network 130, and query output(s) 143 can be output from query executor 104 to client 140 via network 130.

Figure 2:
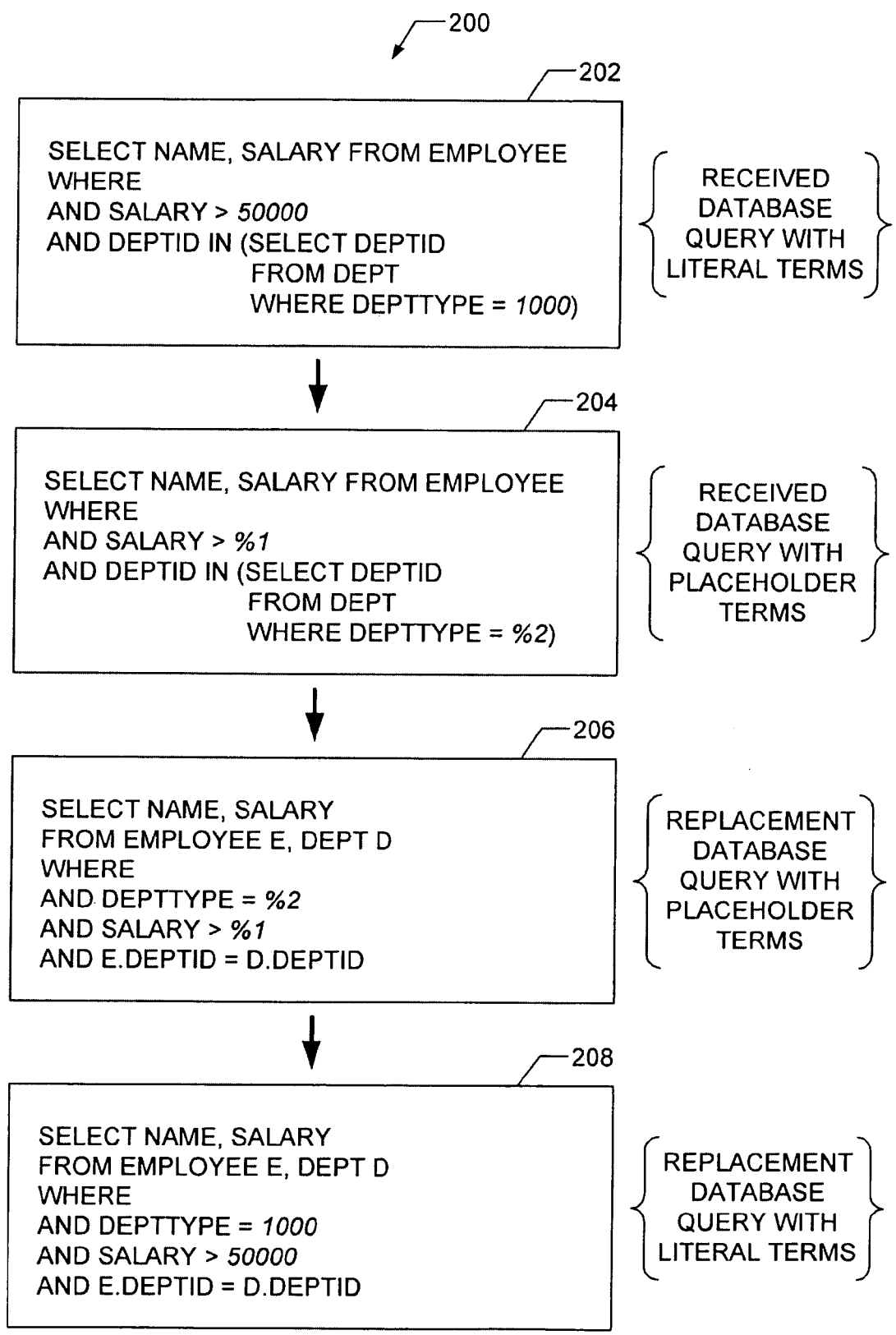
FIG. 2 is a block diagram illustrating an exemplary database query optimization performed, for example, by the exemplary computing device of FIG. 1.

FIG. 2 illustrates an exemplary database query optimization 200 performed, for example, by the exemplary server 102 of FIG. 1. Exemplary optimization 200 includes a received database query with literal terms 202 which may be a query for employees with a certain salary (e.g., greater than $50,000) in a certain department (e.g., department, type 1000). In received database query 202, "50000" and "1000" are examples of literal terms. Exemplary optimization 200 also includes the received database query with placeholder terms 204. For example, the exemplary literal terms of received database query 202 are replaced with exemplary placeholder terms "% 1" and "% 2" in received database query 204, thereby placing query 204 in a template format (e.g., that is independent of literal terms, values, etc.). Exemplary optimization 200 also includes a replacement query with the placeholder terms 206. As will be described further below, replacement query 206 is an optimized replacement query for received database query 204 that includes the same placeholder terms "% 1" and "% 2". Exemplary optimization 200 further includes the replacement database query with the literal terms 208. As will also be described further below, replacement query 208 is an optimized replacement query for received database query 204 that includes the same literal terms "50000" and "1000" from the original received database query 202.

Figure 3:
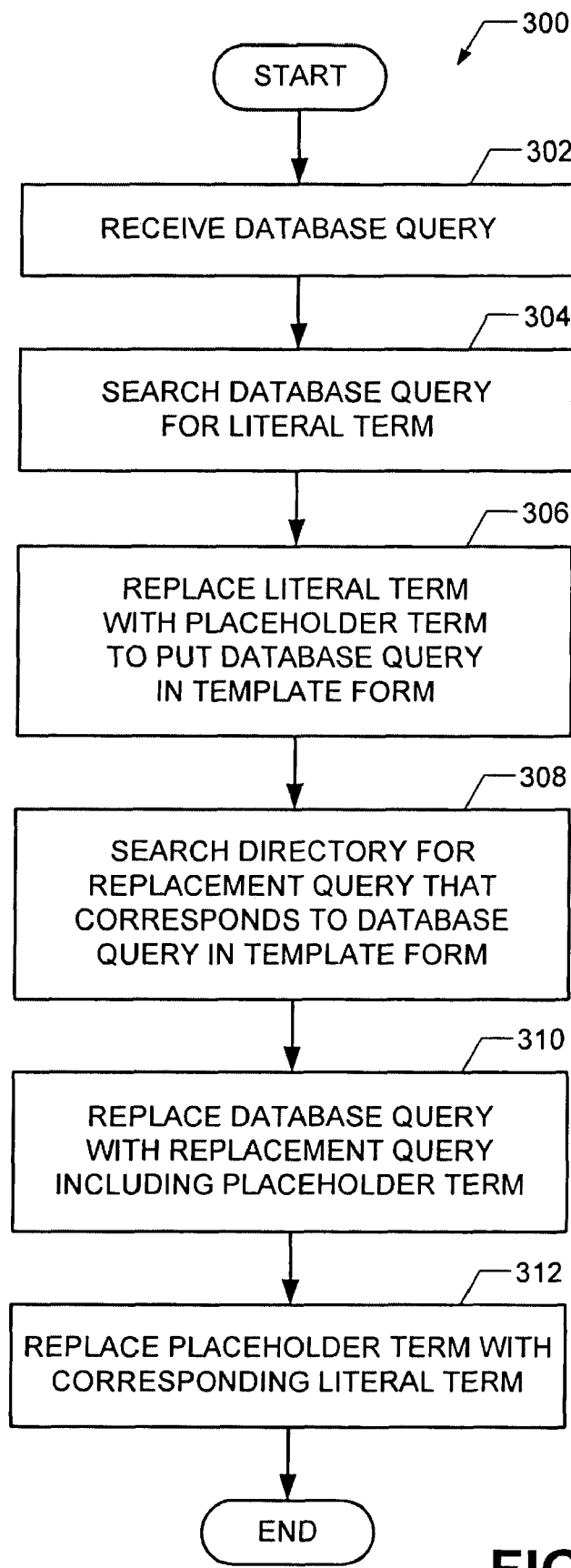
FIG. 3 is a flow diagram illustrating an example of a method for database query optimization executable, for example, as a computer program product on the exemplary computing device of FIG. 1.

FIG. 3 illustrates an example of a method 300 for database query optimization executable, for example, as a computer program product on the exemplary server 102 of FIG. 1. In block 202, a database query (such as received database query 202) is received. This may be performed, e.g., by query replacement engine 108 via query executor 104 executed on server 102. For example, a database query in the form of one or more query inputs 142 can be received by query executor 104 from client 140 via network 130, and the database query (i.e., original query 122) is received by query replacement engine 108 from query executor 104.

In block 304, the received database query is searched for one or more literal terms (e.g., the literal terms "50000" and "1000" in received database query 202). This may be performed, e.g., by parameterizer 112 executed on server 102. In block 306, the one or more literal terms in the database query are replaced (i.e., parameterized) respectively with one or more placeholder terms (e.g., the placeholder terms "% 1" and "% 2" in received database query 204) to put the database query in a canonical or template form (such as received database query 204). This may also be performed, e.g., by parameterizer 112 executed on server 102.

In block 308, a directory (e.g., directory 115) is searched for a replacement query that corresponds to the database query in template form. This may be performed, e.g., by lookup 113 executed on server 102 to search directory 115 for a replacement query (e.g., replacement database query 206) that corresponds to the database query in template form (e.g., received database query 204). In some embodiments, the replacement query is structurally equivalent to the database query so that the processing (e.g., execution) of the replacement query (e.g., by query executor 104) produces an equivalent query result set as the processing of the database query. In other embodiments, the replacement query is semantically equivalent to the database query so that the processing of the replacement query (e.g., by query executor 104) produces the same query action and the same query result as the processing of the database query.

In block 310 the database query (e.g., received database query 204) is replaced with the replacement query (e.g., replacement database query 206) including the one or more placeholder terms (e.g., the placeholder terms "% 1" and "% 2" in received database query 204). This may also be performed, e.g., by lookup 113 executed on server 102. In block 312, the one or more placeholder terms are replaced by the corresponding literal terms (e.g., the literal terms "50000" and "1000" in replacement database query 208). This may be performed, e.g., by translator 114 executed on server 102 and thereby provides a replacement query (e.g., replacement database query 208) for processing (e.g., by query executor 104) that is an optimized substitute for the database query (e.g., received database query 204). For example, the optimized replacement query with literal terms (e.g., replacement query 123) can be received from query replacement engine 108 by query executor 104 and processed by query executor 104, including by query compiler 105 (which may parse, rewrite, and/or further optimize the replacement query) and runtime 106 (which may execute the query to generate one or more query results). The one or more query results can be received as one or more query outputs 143 from query executor 104 via network 130.

In some embodiments, the directory (e.g., directory 115) is activated (e.g., by activation 110) by receiving an input (e.g., activation data 120) of the replacement query (e.g., replacement database query 206) and a corresponding designated query (e.g., received database query 204) to the directory. In that regard, the directory can function as a "warehouse" that contains the source text for each database query that is a candidate for replacement (i.e., a designated query) and the corresponding replacement text for each such query (i.e., a corresponding replacement query). In such embodiments, searching the directory (e.g., in block 308) can include searching for a match between the received database query and the designated query to obtain the corresponding replacement query.

In some embodiments, the directory (e.g., directory 115) is further activated (e.g., by activation 110) by checking the equivalency of the replacement query to the designated query (e.g., by equivalency checker 111). In that regard, checking the equivalency may include checking a structural equivalence of the replacement query to the designated query to ensure that a processing of the replacement query produces an equivalent query result set as the processing of the designated query. For example, this checking for structural equivalence may include ensuring that the processing of the designated query and the corresponding replacement query produces the same metadata result set, e.g., by checking that the results include the same number of columns and have the same data-types in corresponding columns. Furthermore, checking the equivalency may include checking a semantic equivalence of the replacement query to the designated query to ensure that a processing of the replacement query produces a same query action and a same query result as the processing of the designated query. For example, this checking for semantic equivalence may include detecting redundant tables and/or joint predicates in the designated query and considering the effect of such constructs when performing the check.

Elements of exemplary computer system 100, such as server 102 and client 140, are illustrated and described with respect to various components, modules, etc. for exemplary purposes. It should be understood that other variations, combinations, or integrations of such elements that provide the same features, functions, etc. are included within the scope of embodiments of the invention.

The flow diagram described herein is just an example. There may be many variations to this diagram or the blocks (or operations) thereof without departing from the spirit of embodiments of the invention. For instance, the blocks may be performed in a differing order, or blocks may be added, deleted or modified. All of these variations are considered a part of the claimed invention. Furthermore, although an exemplary execution of the flow diagram blocks is described with respect to exemplary computer system 100 and exemplary optimization 200, execution of the flow diagram blocks may be implemented with respect to other systems and optimizations that provide the same features, functions, etc. in accordance with exemplary embodiments of the invention.

Exemplary embodiments of the invention can be implemented in hardware, software, or a combination of both. Those embodiments implemented in software may, for example, include firmware, resident software, microcode, etc. Exemplary embodiments of the invention may also be implemented as a computer program product accessible from a computer-usable or computer-readable medium providing program code for use by or in connection with a computer or other instruction execution system. In this regard, a computer-usable or computer-readable medium can be any apparatus that can contain, store, communicate, propagate, or transport, the program for use in connection with the instruction execution system, apparatus, or device.

The computer-usable or computer-readable medium can be an electronic, magnetic, optical, electromagnetic, infrared, or semiconductor system (apparatus, device, etc.) or a propagation medium. Examples of a computer-readable medium include a semiconductor or solid state memory, magnetic tape, a removable computer diskette, a random access memory (RAM), a read-only memory (ROM), a rigid magnetic disk, or an optical disk. Some current examples of optical disks include compact disk-read only memory (CD-ROM), compact disk-read/write (CD-R/W), or digital video disk (DVD).

A data processing system suitable for storing and/or executing program code can include at least one processor coupled directly or indirectly to memory elements through a system bus. The memory elements can include local memory employed during actual execution of the program code, bulk storage, or cache memories that provide temporary storage of at least some program code to reduce the number of times the code needs to be retrieved from bulk storage during execution.

Input/output (I/O) devices (e.g., keyboards, displays, pointing devices, etc.) can be coupled to the data processing system either directly or through intervening I/O controllers. Network adapters may also be coupled to the data processing system to allow the system to be coupled to other data processing systems or remote printers or storage devices through intervening private or public networks. Telephonic modems, cable modems, and ethernet cards are a few examples of the currently available types of network adapters.

While exemplary embodiments of the invention have been described, it will be understood that those skilled in the art, both now and in the future, may make various improvements and enhancements which fall within the scope of the claims that follow. These claims should be consider to maintain the proper protection for the invention first described.

What is claimed is:

1. A computer program product for database query optimization, comprising a non-transitory computer usable medium having a computer readable program, wherein the computer readable program, when executed on a computer, causes the computer to:
   receive a database query;
   search the database query for a literal term;
   replace the literal term in the database query with a placeholder term to put the database query in a template form;
   search a directory for a replacement query that corresponds to the database query in the template form;
   replace the database query with the replacement query and include the placeholder term in the replacement query;
   check that the processing of the database query in the template form and the replacement query produces a same number of columns for the replacement query;
   check that the processing of the database query in the template form and the replacement query produces a same data-types in the columns for the database query and the same data-types in the columns for the replacement query;
   replace the placeholder term in the replacement query with the corresponding literal term to put the replacement query in an executable format;
   wherein the replacement query is an optimized substitute for the database query; and
   running the replacement query instead of the database query to provide query results to a requesting client;
   wherein the literal term is ignored such that a match is declared even when the database query and the replacement query have non-matching terms.

2. The computer program product of claim 1, wherein the replacement query is structurally equivalent to the database query so that a processing of the replacement query produces an equivalent query result set as the processing of the database query.

3. The computer program product of claim 1, wherein the replacement query is semantically equivalent to the database query so that a processing of the replacement query produces a same query action and a same query result as the processing of the database query.

4. The computer program product of claim 1, wherein the computer readable program, when executed on the computer, further causes the computer to activate the directory, wherein activating the directory includes receiving an input of the replacement query and a corresponding designated query to the directory, and wherein searching the directory comprises searching for a match between the database query and the designated query.

5. The computer program product of claim 4, wherein activating the directory further comprises checking the equivalency of the replacement query to the designated query, wherein checking the equivalency includes:
   checking a structural equivalence of the replacement query to the designated query to ensure that a processing of the replacement query produces an equivalent query result set as the processing of the designated query; and
   checking a semantic equivalence of the replacement query to the designated query to ensure that a processing of the replacement query produces a same query action and a same query result as the processing of the designated query.

* * * * *